(12) United States Patent
Shen et al.

(10) Patent No.: US 9,016,874 B2
(45) Date of Patent: Apr. 28, 2015

(54) PROJECTOR

(75) Inventors: Chun-Ming Shen, Taipei (TW);
Hsin-Hung Li, Taoyuan County (TW);
Chun-Hong Chen, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 389 days.

(21) Appl. No.: 12/833,011

(22) Filed: Jul. 9, 2010

(65) Prior Publication Data

US 2011/0013155 A1      Jan. 20, 2011

(30) Foreign Application Priority Data

Jul. 15, 2009   (TW) .............................. 98123985 A

(51) Int. Cl.
   *G03B 21/20*      (2006.01)
(52) U.S. Cl.
   CPC .............. *G03B 21/20* (2013.01); *G03B 21/202* (2013.01); *G03B 21/2093* (2013.01); *G03B 21/2086* (2013.01)
(58) Field of Classification Search
   CPC .. G03B 21/2086; G03B 21/20; G03B 21/202; G03B 21/2026; G03B 21/2093
   USPC ....................................................... 353/119
   See application file for complete search history.

(56) References Cited

U.S. PATENT DOCUMENTS

| | | | |
|---|---|---|---|
| 5,301,346 A * | 4/1994 | Notarianni et al. ........... 700/267 |
| 5,722,753 A * | 3/1998 | Okada et al. .................. 353/119 |
| 6,494,581 B2 * | 12/2002 | Shimizu ......................... 353/61 |
| 6,509,674 B1 * | 1/2003 | Nakagawa ..................... 313/113 |
| 6,698,899 B2 * | 3/2004 | Yamada et al. ................. 353/61 |
| 6,902,275 B2 * | 6/2005 | Yamada et al. ................. 353/61 |
| 7,052,147 B2 * | 5/2006 | Katsuma et al. .............. 353/119 |
| 7,472,996 B2 * | 1/2009 | Suzuki ............................ 353/60 |
| 7,507,006 B2 * | 3/2009 | Kao ............................... 362/455 |
| 7,591,571 B2 * | 9/2009 | Takeda ......................... 362/373 |
| 7,631,992 B2 * | 12/2009 | Miyasu et al. ................ 362/373 |
| 7,828,469 B2 * | 11/2010 | Liu et al. ....................... 362/377 |
| 7,862,186 B2 * | 1/2011 | Hamada ........................ 353/119 |
| 2002/0039174 A1 * | 4/2002 | Yamada et al. ................. 353/31 |
| 2002/0039176 A1 * | 4/2002 | Watanabe ....................... 353/98 |

(Continued)

FOREIGN PATENT DOCUMENTS

| CN | 101414109 A | 4/2009 | |
|---|---|---|---|
| EP | 1195640 A1 * | 4/2002 | ............ G03B 21/16 |

(Continued)

OTHER PUBLICATIONS

Double Coated PET Tapes, Technical Data, Apr. 3, 2003, 3 pages.

(Continued)

*Primary Examiner* — Sultan Chowdhury
*Assistant Examiner* — Bao-Luan Le

(57) ABSTRACT

A projector being operated at a working surface is provided. The projector includes a casing, a light source module and a transparent blocking member. The casing has a first surface and a second surface. The first surface is adjacent to the working surface and opposite to the second surface. The second surface has an opening. The light source module corresponding to the opening is disposed in the casing. The light source module can be assembled and disassembled through the opening. The transparent blocking member is disposed on the second surface and covers the opening.

6 Claims, 2 Drawing Sheets

(56) References Cited

U.S. PATENT DOCUMENTS

| | | | |
|---|---|---|---|
| 2002/0145033 A1* | 10/2002 | Dakolios | 229/117.23 |
| 2003/0071977 A1* | 4/2003 | Miyamoto et al. | 353/52 |
| 2004/0023614 A1* | 2/2004 | Koplin | 454/184 |
| 2004/0114113 A1* | 6/2004 | Yamada et al. | 353/61 |
| 2004/0233399 A1* | 11/2004 | Katsuma et al. | 353/119 |
| 2006/0033889 A1* | 2/2006 | Terashima et al. | 353/85 |
| 2006/0065296 A1* | 3/2006 | Chien et al. | 136/206 |
| 2006/0109656 A1* | 5/2006 | Takeda | 362/294 |
| 2006/0274530 A1* | 12/2006 | Lin et al. | 362/294 |
| 2007/0064198 A1* | 3/2007 | Yoshimura | 353/20 |
| 2007/0147051 A1* | 6/2007 | Miyasu et al. | 362/362 |
| 2008/0117389 A1* | 5/2008 | Hamada | 353/119 |
| 2008/0144317 A1* | 6/2008 | Ochi | 362/257 |
| 2009/0051887 A1* | 2/2009 | Chen et al. | 353/119 |
| 2009/0059181 A1* | 3/2009 | Loomis et al. | 353/61 |
| 2009/0103059 A1 | 4/2009 | Chou | |
| 2009/0153707 A1* | 6/2009 | Nakao | 348/294 |
| 2009/0196040 A1* | 8/2009 | Liu et al. | 362/253 |

FOREIGN PATENT DOCUMENTS

| | | | | |
|---|---|---|---|---|
| EP | 1602971 A1 * | 12/2005 | | |
| EP | 1688787 A1 * | 8/2006 | | |
| EP | 1933201 A2 * | 6/2008 | | G03B 21/16 |
| EP | 1933201 A3 * | 3/2010 | | |
| KR | 100714536 B1 * | 8/2005 | | |
| WO | WO 2004074927 A1 * | 9/2004 | | G03B 21/14 |

OTHER PUBLICATIONS

Office action cited in the counterpart application by CN Patent Office on Jun. 2, 2010.

* cited by examiner

PROJECTOR

This application claims the benefit of Taiwan application Serial No. 0 98123985, filed Jul. 15, 2009, the subject matter of which is incorporated herein by reference.

BACKGROUND OF THE INVENTION

1. Field of the Invention

The present invention relates generally to a projector, and, more particularly, to a projector fixed and operated at a working surface.

2. Description of the Related Art

A projector ceiling mount is to expand and projecting the image light downward and toward the front. Generally, there is an opening of ceiling projector with a cover towards user for being convenient to replace the lamp. Therefore, user can open the cover of the projector to replace a new lamp directly when the old lamp is not workable. The user doesn't have to remove the projector from the ceiling for further replacing a new lamp.

However, the inside of projector 100 cannot be viewed from the outside before opening the cover of projector 100. The user don't know the reason that lamp stops illuminating causing by the lamp exploded or the lamp aged to terminated. Thus, the user needs to open the cover to check the condition of lamp. In case, the projector ceiling mounted and the lamp explosion, when the user opens the cover, the fragments of the lamp may drop into user's eyes or on user's body resulting in hurt.

What is needed in the art is to provide a projector with protection mechanism, which ensures users to operate safely and conveniently.

SUMMARY OF THE INVENTION

The present invention provides a projector, which is disposed a transparent blocking member to increase safety and convenience.

A projector, operated at a working surface, comprises a casing, a light source module, and a transparent blocking member. The projector may be fixed on a ceiling or a wall. The casing has a first surface and a second surface. The first surface is adjacent to the working surface and opposite to the second surface. The first surface has at least one supporting connecting or fixed on the working surface. The second surface has an opening. The light source module is disposed inside the casing and corresponding to the opening. The light source module can be replaced through the opening. The transparent blocking member is disposed on the second surface and covering the opening.

The invention will become apparent from the following detailed description of the preferred but non-limiting embodiments. The following description is made with reference to the accompanying drawings.

DETAILED DESCRIPTION OF THE INVENTION

Figure 1:
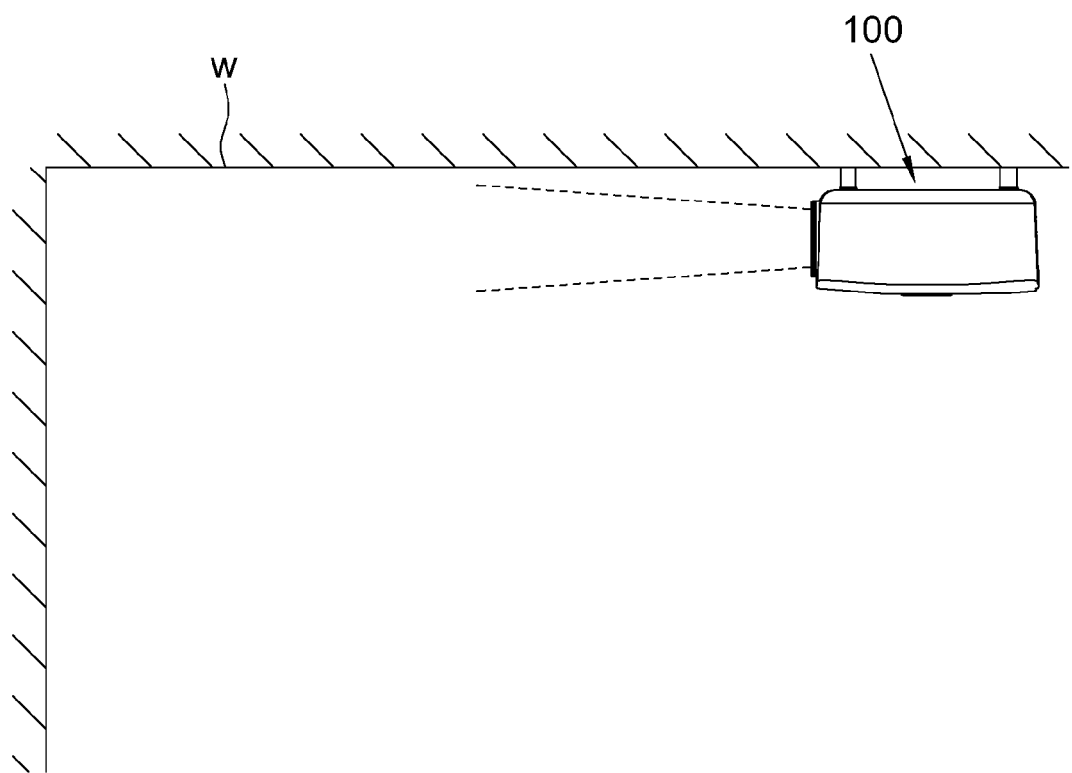
FIG. 1 is a projector according to an embodiment of the present invention.
Figure 2A:
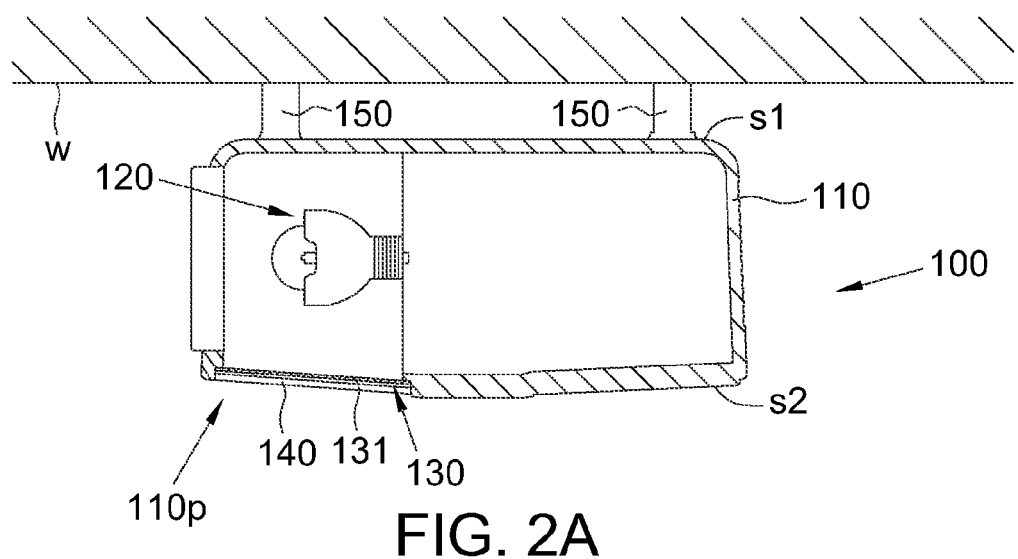
FIG. 2A is a side view of FIG. 1 of projector according to an embodiment of the present invention.

Referring to FIGS. 1 & 2A, FIG. 1 is a preferred embodiment of present invention schematically illustrating a projector, and FIG. 2A is perspective view of projector of FIG. 1. In present embodiment, projector 100 is operated at a working surface w, and working surface w is ceiling. Projector, in FIG. 2A, includes a casing 110, a light source module 120, a transparent blocking member 130, a cover plate 140 and at least one supporting 150. Casing 110 includes a first surface s1 and a second surface s2. First surface s1 is adjacent to working surface w and opposite to second surface s2, and second surface s2 has an opening 110$p$.

Light source module 120 corresponding to the opening 110$p$ is disposed in the casing 110, which can be replaceable through opening 110$p$. Transparent blocking member 130 is disposed on second surface s2 and covers the opening 110$p$. In some embodiments, it should be appreciated that transparent blocking member 130 may be adhered, engaged or screwed, but not limited, to the casing 110 to cover the opening 110$p$. In present embodiment, transparent blocking member 130 including an adhesive portion 131 towards light source module 120 is adhered to the casing 110 to cover the opening 110$p$. Generally, light source module 120 is at a condition of light temperature when projector 100 operates so that transparent blocking member 130 is preferably adopted to heat-resistant material. Cover plate 140 is disposed on second surface s2 and covers transparent blocking member 130.

Figure 2B:
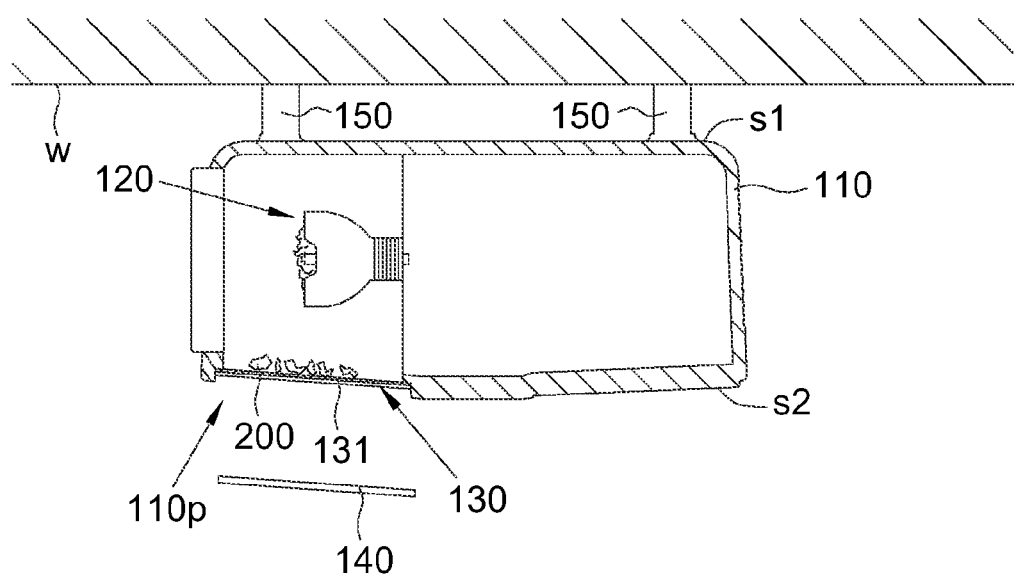
FIG. 2B is a side view of FIG. 2A of projector when cover plate is removed.

As shown in FIG. 2B, when light source module 120 cannot be illuminated, after removing the cover 140, the inside of projector 100 can be viewed from the outside through transparent blocking member 130 to check why light source module 120 cannot be illuminated. Accordingly, when light source module 120 cannot be illuminated due to the lamp of light source module 120 is exploded. Fragments 200 of lamp can be effectively isolated and noticed by the user through transparent blocking member 130, which preserves user from hurting by dropping fragments 200. Furthermore, fragments 200 of lamp can be adhered by an adhesive portion 131 of transparent blocking member 130, and projector 100 can be replaced another transparent blocking member 130 when light source module 120 is already replaced.

Although, in present embodiment, adhesive portion 131 of transparent blocking member 130 is described to prevent fragments 200 from dropping, those skill in the art will appreciate that this is not required.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projector, operated at a working surface, comprising:
   a casing comprising a first surface and a second surface, the first surface adjacent to the working surface and opposite to the second surface;
   a light source module disposed in the casing and removable through an opening of the second surface;
   a transparent blocking member disposed on the second surface and perforation-free to cover the whole opening,
   a cover plate disposed on the second surface and covering the transparent blocking member,
   wherein the transparent blocking member includes an adhesive portion towards the light source module, and after the light source module explodes, fragments of the light source module fall on the transparent blocking member and are adhered by the adhesive portion.

2. The projector according to claim 1, wherein the transparent blocking member is adhered to the casing to cover the opening.

3. The projector according to claim 1, wherein the transparent blocking member is engaged with the casing to cover the opening.

4. The projector according to claim 1, wherein the transparent blocking member is screwed to the casing to cover the opening.

5. The projector according to claim 1, wherein the working surface is a ceiling, the first surface further comprising at least one supporting for connecting the ceiling and the casing.

6. A projector mounted on a ceiling, the projector comprising:
- a supporting;
- a casing, the supporting connecting a first surface of the casing and the ceiling, the first surface been opposite to a second surface of the casing;
- a light source module disposed in the casing and removable through an opening of the second surface;
- a transparent blocking member disposed on the second surface and perforation-free to cover the whole opening,
- a cover plate disposed on the second surface and covering the transparent blocking member,
- wherein the transparent blocking member includes an adhesive portion towards the light source module, and after the light source module explodes, fragments of the light source module fall on the transparent blocking member and are adhered by the adhesive portion.

\* \* \* \* \*